(12) United States Patent
Apley (10) Patent No.: US 9,513,403 B2
(45) Date of Patent: Dec. 6, 2016

(54) METHODS AND SYSTEMS FOR DISPLAYING CUSTOMIZED ICONS

(75) Inventor: Phillip George Apley, Maynard, MA (US)

(73) Assignee: PECK LABS, INC, Maynard, MA (US)

( * ) Notice: Subject to any disclaimer, the term of this patent is extended or adjusted under 35 U.S.C. 154(b) by 407 days.

(21) Appl. No.: 12/843,229

(22) Filed: Jul. 26, 2010

(65) Prior Publication Data

US 2011/0022294 A1    Jan. 27, 2011

Related U.S. Application Data

(60) Provisional application No. 61/271,871, filed on Jul. 27, 2009.

(51) Int. Cl.
| | |
|---|---|
| *G01W 1/02* | (2006.01) |
| *G01W 1/00* | (2006.01) |
| *G08G 5/00* | (2006.01) |
| *G01W 1/10* | (2006.01) |

(52) U.S. Cl.
CPC ............. *G01W 1/00* (2013.01); *G08G 5/0013* (2013.01); *G08G 5/0021* (2013.01); *G08G 5/0091* (2013.01); *G01K 2203/00* (2013.01)

(58) Field of Classification Search
CPC ......... G01W 1/02; G01W 1/10; G08G 5/0013; G08G 5/0021; G08G 5/0091
See application file for complete search history.

(56) References Cited

U.S. PATENT DOCUMENTS

| | | | | |
|---|---|---|---|---|
| 5,279,134 | A * | 1/1994 | Nonogaki | D06F 9/005 345/168 |
| 6,828,922 | B1 * | 12/2004 | Gremmert et al. | 340/949 |
| 7,197,715 | B1 * | 3/2007 | Valeria | H04N 5/4401 348/E5.099 |
| 7,308,697 | B1 * | 12/2007 | Jerding | H04L 12/2801 348/E7.063 |
| 7,421,344 | B1 * | 9/2008 | Marsh | G01W 1/02 702/3 |
| 7,612,688 | B1 * | 11/2009 | Vigeant-Langlois et al. | 340/971 |

(Continued)

*Primary Examiner* — Ryan Zeender
*Assistant Examiner* — Dana Amsdell
(74) *Attorney, Agent, or Firm* — Richard B. Amster (57) ABSTRACT

A method (and system for practicing the method) for processing and reporting a characteristic of a resource for a domain (e.g., weather forecast for a flight route). A request is sent to a server for customized data for the resource, preferably containing at least a unique application identifier. Customized data is received from the server, wherein said data contain a plurality of customized conditional result values of characteristics of the resource at a multiplicity of domain values, generated using values of the characteristics of the resource at various domain values and conditionals specific to the application identifier. A graphical chart (often in the form of a circle or spiral) is displayed based on the received customized data, wherein the location of the graphical chart on the display device corresponds to said resource, and furthermore wherein the colors of the chart at each of a plurality of points upon the chart are each determined based on the customized conditional result value of the characteristics of the resource for a domain value (e.g., time), said domain value corresponding to the rotational angle of said point upon the chart.

20 Claims, 6 Drawing Sheets

(56) References Cited

U.S. PATENT DOCUMENTS

| | | | | |
|---|---|---|---|---|
| 7,685,237 | B1* | 3/2010 | Weaver | G06Q 10/10 709/205 |
| 8,296,686 | B1* | 10/2012 | Tedesco | G06F 19/3406 434/112 |
| 2001/0030624 | A1* | 10/2001 | Schwoegler | G01W 1/10 342/357.52 |
| 2002/0039072 | A1* | 4/2002 | Gremmert et al. | 340/945 |
| 2002/0131331 | A1* | 9/2002 | Molander | G06F 3/04847 368/82 |
| 2003/0074454 | A1 | 4/2003 | Peck | |
| 2004/0010372 | A1* | 1/2004 | Schwoegler | G01W 1/10 702/3 |
| 2004/0183695 | A1* | 9/2004 | Ruokangas | G01W 1/02 340/945 |
| 2007/0112511 | A1* | 5/2007 | Burfeind et al. | 701/213 |
| 2008/0209468 | A1* | 8/2008 | Milosevski | G04B 19/00 725/39 |
| 2009/0007017 | A1* | 1/2009 | Anzures | G06F 3/04883 715/835 |
| 2009/0288004 | A1* | 11/2009 | Strandell | G06F 9/4443 715/710 |
| 2010/0038854 | A1* | 2/2010 | Mraz | F41J 5/056 273/371 |
| 2010/0180295 | A1* | 7/2010 | Ratsch | H04N 7/163 725/34 |
| 2011/0022294 | A1* | 1/2011 | Apley | G01W 1/00 701/532 |
| 2011/0197139 | A1* | 8/2011 | Huberman | G06Q 50/10 715/738 |

* cited by examiner

[PRIOR ART]

METHODS AND SYSTEMS FOR DISPLAYING CUSTOMIZED ICONS

FIELD OF THE INVENTION

The present invention relates to the visual display of data using customized icons, particularly the use of customized icons to convey time-dependent changes in relation to time-invariant data.

BACKGROUND

The presentation of complex information to users is a continuing challenge. This challenge is exacerbated by the explosion in data availability and mechanisms for data delivery, on the one hand, and by information needs, on the other. Extracting and delivering "information" from raw "data" is a new frontier, wherein we are challenged to match human perceptual capabilities with computer and communication system operations. The broadcast and webcast of formatted data to selected and general audiences is a common and increasingly important benefit of Internet and web technologies and networks. The ability to rapidly update databases and reports and promptly inform a multiplicity of users of relevant information, by either push or pull information modalities, is helping to provide the benefits of the information age to millions of people around the world. Yet the (often frequently updated) delivery of prodigious amounts of data (often in formatted structures) often creates an undesirable deluge of data which cannot be readily consumed by users.

In a vast number of circumstances, after data is gathered, the need exists to then package or convert the data into information that can be presented to one or more human beings for their cogitation or enjoyment. Addressing particularly those instances in which the information is or may be information that is actionable or could prompt action by the user, much attention has been given as to how best to present such information. In particular, a great deal of effort has gone into determining how to present complex, interrelated information visually, so as to facilitate a person quickly recognizing the inter-relationships among different data sets. Challenges exist as to how to present the information in a way that is most useful and discernible, and least susceptible to misinterpretation. For example, how to inter-relate a geographical map with a portrayal of time-varying conditions, such as forecast weather conditions, on some portion(s) of the map, is a challenge. One could present a series of images, such as images projecting conditions at each of a succession of times, but there is no widely accepted way of presenting in a single image a representation of that whole sequence. Pilots planning their routes thus lack a single image which can convey to them the forecast for conditions along their intended route over a span of time.

Moreover, one pilot's need for information may differ from the next, and their interpretations of the data may treat the same data as conveying different information.

Similar needs exist in many different information domains, the foregoing example of pilots planning routes merely being exemplary. There is, therefore, a long felt need to provide formatted data and reports to populations of users in a method that allows each user or many users to flexibly specify priorities of interest by the user, or certain aspects of meaning, in particular types and values of information contained in the provided data, and in preferred methods of presentation.

SUMMARY

Among the needs which exist, therefore, is that of a display and display methodology which can convey forecasted time-varying (or otherwise-varying) conditions in a single image, rather than a sequence of images, possibly along with other, static information.

According to a first aspect, there is shown a method for processing and reporting weather forecast data (e.g., for aviation route planning). Such method includes sending a request to a server for personalized weather forecast data for a particular geographic region, said request containing at least a unique identifier for a user. The personalized weather forecast data is received from the server for said region, wherein said data contain a multiplicity of personalized desirability values of forecasted weather conditions for said region at a multiplicity of times, generated using weather forecast information for said region and conditionals specific to the user. A circular or spiral-shaped graphical chart is generated on a display device based on the received customized weather forecast data, wherein the location of the graphical chart on the display device corresponds to said geographic region, and furthermore wherein the colors of the spiral at each of a multiplicity of points upon the spiral are each determined based on the personalized desirability value of the forecasted weather conditions at a specific time, said time corresponding to the rotational angle of said point upon the spiral.

According to a second aspect, there is provided, more generally, a method for processing and reporting a characteristic of a resource for a domain. This method comprises sending a request to a server for customized data for the resource, said request containing at least a unique application identifier; receiving customized data from the server, wherein said data contain a multiplicity of customized conditional result values of characteristics of the resource at a multiplicity of domain values, generated using values of the characteristics of the resource at various domain values and conditionals specific to the application identifier; and generating a spiral-shaped graphical chart on a display device based on the received customized data, wherein the location of the graphical chart on the display device corresponds to said resource, and furthermore wherein the colors of the spiral at each of a multiplicity of points upon the spiral are each determined based on the customized conditional result value of the characteristics of the resource for a domain value, said domain value corresponding to the rotational angle of said point upon the spiral.

According to a third aspect there is provided a method for processing and reporting a set of data values over an icon domain range, wherein said icon domain range in its entirety is not otherwise included in the reported material. This method comprises sending a request to a server for customized data, said request containing at least a unique application identifier; receiving the customized data from the server, wherein said customized data contain a multiplicity of functional result values at a multiplicity of domain values, generated by processing functions specific to the application identifier; generating a spiral-shaped graphical chart on a display device based on the received customized data, wherein the location of the graphical chart on the display device corresponds to a region in one or more domains differing from said icon domain range, and furthermore wherein the colors of the spiral at each of a multiplicity of points upon the spiral are each determined based on the received functional result value as evaluated at an icon domain value.

A fourth aspect is a system containing one or more processors and one or more memories containing processor-executable instructions to send a request over a network to a server for personalized weather forecast data for a particular geographic region, said request containing at least a unique identifier for a user; receive personalized weather forecast data from the server for said region, wherein said data contain a multiplicity of personalized desirability values of forecasted weather conditions for said region at a multiplicity of time values, generated using weather forecast information for said region and conditionals specific to the user; and generate a spiral-shaped graphical chart on a display device based on the received customized weather forecast data, wherein the location of the graphical chart on the display device corresponds to said geographic region, and furthermore wherein the colors of the spiral at each of a multiplicity of points upon the spiral are each determined based on the personalized desirability value of the forecasted weather conditions at a time value, said time value corresponding to the rotational angle of said point upon the spiral.

A fifth aspect is a system or device containing one or more processors and one or more memories containing processor-executable instructions to send a request over a network to a server for weather forecast data for a particular geographic region; receive weather forecast data from the server for said region; using the received weather forecast data and personalized thresholds and conditionals stored in the one or more memories, calculate a multiplicity of personalized desirability values of forecasted weather conditions for said region at a multiplicity of time values; and generate a spiral-shaped graphical icon on a display device based on the calculated personalized desirability values, wherein the colors of the spiral at each of a multiplicity of points upon the spiral are each determined based on the personalized desirability value of the forecasted weather conditions at a time value, said time value corresponding to the rotational angle of said point upon the spiral.

A sixth aspect is a method for displaying weather forecast data for aviation route planning comprising displaying on a display medium a spiral-shaped graphical icon produced from personalized desirability values generated from weather forecast data and personalized aviator thresholds or conditionals, wherein the location of the graphical icon on the display medium corresponds to a location on said aviation route, and furthermore wherein the colors of the graphical icon at each of a multiplicity of points upon the graphical icon are each determined based on the personalized desirability value of the forecasted weather conditions at a time value.

A seventh aspect is a display surface displaying an icon which illustrates graphically how a condition at a location on a displayed map has changed or is forecast to change over a predetermined period of time, the icon comprising a circle or a spiral and the change of condition being rendered by a change in a color at a location on the icon corresponding to a time at which the change occurred or is forecast to occur.

An eighth aspect is a device comprising a module for receiving a feed of information, such as weather information, and for storing at least portions of said information; a module for receiving personalization preferences of a user; and a module for processing the stored information and the personalization information to generate a display of an icon conveying, relative to the personalization information, how conditions have changed or are forecast to change over time at one or more locations or according to a parameter analogous to location.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead being placed upon generally illustrating the various concepts discussed herein.

DETAILED DESCRIPTION

The methods and systems shown herein are intended to augment those disclosed in U.S. patent application Ser. No.

10/199,442, filed Jul. 20, 2002 (Publication 2003/0074454 A1 to Peck), which is hereby incorporated by reference.

In some possible embodiments, customized icons are produced from data relating to a certain event or series of events. Customized icons can be produced in a variety of forms. Some of the possible forms are based on the idea that a particular set of properties of a temporal system is chosen (e.g., weather attributes, meteor showers, astronomical events, failure occurrences of machinery, ice flows, the migration pattern of animals, economic circumstances, electron migration, radioactive decay, radiation events, system or machinery maintenance events, performance, political activity, market conditions, etc.) and analyzed in the context of current and projected data. A set of custom thresholds may be used to personalize the data or the presentation of the data. In some embodiments, the data may be rendered in color (e.g., red, yellow, green) and/or pattern (e.g., various stipple patterns) to produce an icon that represents both time and the predicted, current, expected or past behavior of the system.

In some possible embodiments, the output of a function is represented using a customized icon on a graphical chart or item of display, such that the customized icon represents the functional output as a function of a domain not otherwise represented in the chart. In such embodiments, the customized icon is useful for adding an extra dimension or dimensions of data not otherwise represented on the chart. Though the possible embodiments are not limited to the following examples, the following examples are provided for the sake of illustration.

Figure 1:
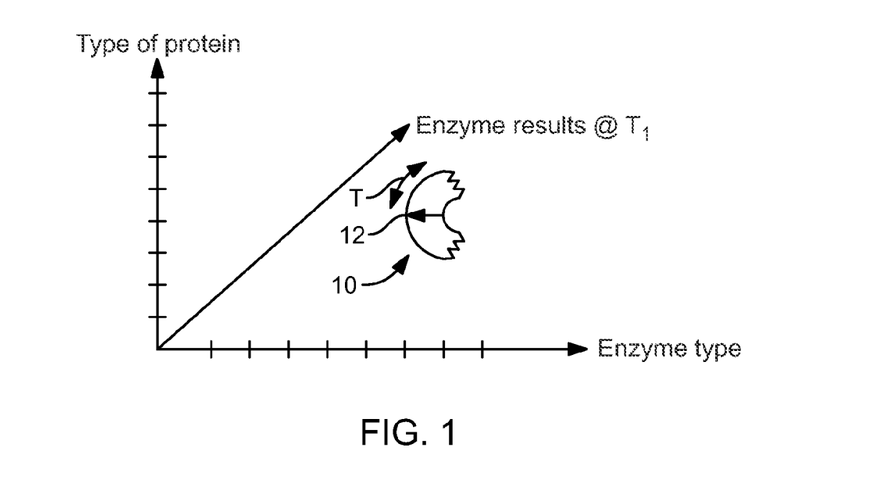
FIG. 1 is a chart depicting an example of some aspects of the inventive approach, wherein a customized icon on a graphical chart or item of display shows various enzyme screening results on various proteins as a function of temperature.

In a first particular example, as depicted in FIG. 1, various enzyme screening results on various proteins under various conditions are represented on a graphical chart. The customized icon 10 adds a dimension to the domain of the chart which otherwise would not be represented in a two-dimensional chart. In this example, the types of enzymes could be represented along the x-axis of a three-dimensional plot of data, the types of proteins could be represented along the y-axis of the chart, and the enzyme screening results at a certain temperature ($T_1$) could be plotted along the z-axis of the chart. The inventive concepts could then be used to represent the screening results of each of the enzymes as a function of temperature. At one or more locations on the plotted data in the chart, such as at point 12, a customized icon 10 could be used to add the extra dimension of temperature to the chart, in which the customized icon depicts the screening result of that particular enzyme on that particular protein for several temperatures or a range of temperatures for which the enzyme was interacted with the protein, the various temperatures being indicated by the letter T and the adjacent double-headed arrow indicating that movement along icon 10 corresponds to different temperatures. Thus, in this particular example, a chart which normally would have been three-dimensional has been made four-dimensional at relevant locations.

In some possible embodiments, when placed on a map or geographic chart, such graphics will indicate that the conditions forecast or history applied to an area of the chart vary with time. In some possible embodiments, the area of the chart to which the customized icon applies may be depicted by an outline or other demonstrative marking that surrounds the icon at an appropriate distance.

The inventive concepts may be used in many contexts, to illustrate with an icon that a parameter varies with a variable not represented by axes or other aspects of the underlying image. For example, when placed on a diagram of machinery, such an icon may be used to indicate the expected service schedule, load, or scheduled downtime for a particular piece of machinery, e.g., an aircraft or electron scanning microscope, or for factory machinery such as a lithography device. In other possible embodiments, such an icon may indicate the status of breeding conditions for a group of animals as a function of time, wherein the location of the customized icon on a chart represents a particular geographic region. In yet another possible embodiment, it may indicate the maintenance status of manufacturing devices over time, wherein the location of the customized icon on a chart indicates a particular manufacturing device or group of devices or part of a device. In yet another possible embodiment, such an icon may indicate some past, present, or future data values which vary over time, wherein the location of the customized icon on a chart is indicative of which species of a genus is being referred to by the icon. It should be clear, however, that the icon may represent variability over some parameter other than time.

In some embodiments, such icons can be printed, hand- or machine-drawn or otherwise represented on paper or on viewable media, viewed on a computer display or monitor, viewed on a projection screen, heads-up display, hologram, viewer, or either transmitted electronically or stored on a machine-readable media as any manner of data which can be formed into an image in manners known in the art, such as but not limited to digital image formats such as JPEG, GIF, TIFF, MPEG, PCX, PS, PDF, DOC, etc.

Figure 2:
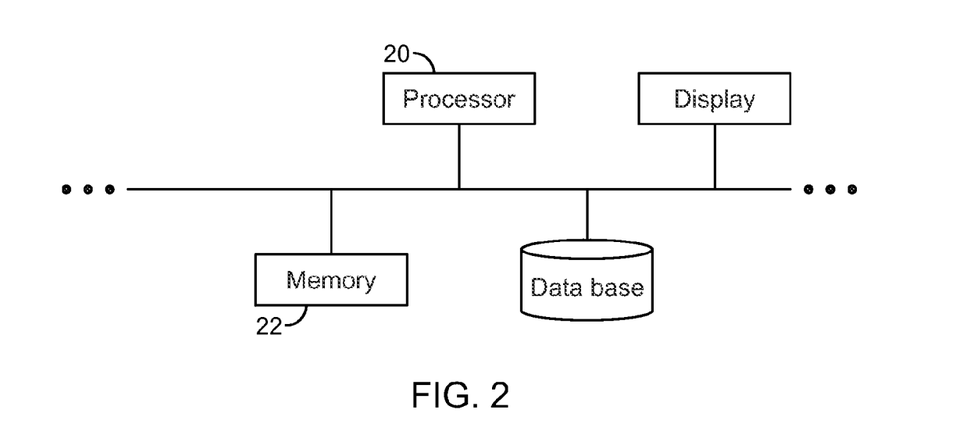
FIG. 2 is a block diagram showing basic elements of a system for practicing various aspects taught herein.

In some possible embodiments, a system according to these teachings generates a customized icon by processing data according to parameters. In some embodiments of such a system, with reference to FIG. 2 the system may constitute one or more processors 20 and one or more memories 22 containing instructions to be executed on the one or more processors to process data according to provided parameters and produce a customized icon.

Figure 3:
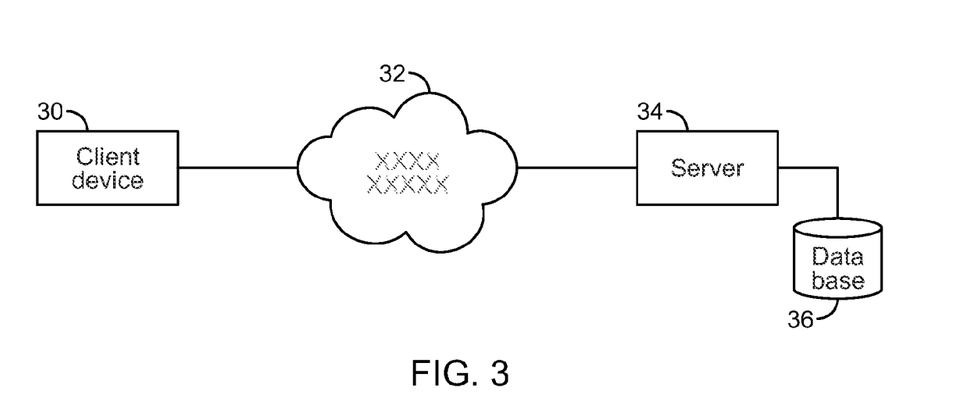
FIG. 3 is a block diagram of a network for practicing certain aspects taught herein.

In yet other embodiments, a system as taught herein, with reference to FIG. 3, may constitute a client device 30 connected over a network 32 to a server device 34, in which the client device sends a request for customized data to the server device, wherein said request contains certain parameters to determine a user or application. The server receives the request from the client device for customized data, obtains data from a network 32 or database 36 based on the supplied parameters, and processes the data based on certain functions specific to those parameters. The server then sends the data back to the client device, and the client device generates a customized icon based on the data received from the server. In other embodiments, the client device may request a customized icon based on certain parameters, and the server may generate a digital representation of the requested customized icon and transmit the digital representation to the client device.

Figure 4:
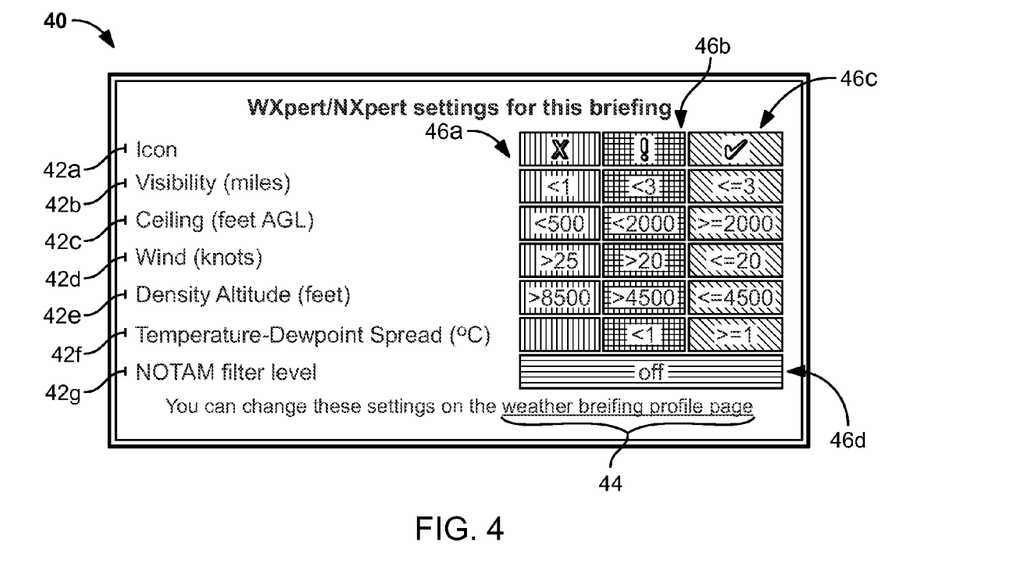
FIG. 4 is an illustration of one possible example of a screen which displays a table of custom thresholds or parameters selected by a user of a system for generating icons as taught herein, particularly in this example a Personalized Forecast or History Icon (PFHI) for aviators, to provide customized weather forecast or history information.

In some possible embodiments, the customized icon may be a Personalized Forecast or History Icon (PFHI), which depicts forecasted weather conditions for a particular location, customized to some conditionals for a particular application or user. For example, such a user may be the driver of a car on a trip, and conditionals may represent his preferences for the activities he wants to accomplish on the trip—e.g., not wanting to hike or picnic in the rain. In another example, such a user may be an aviator, and the conditionals may include the aviator's licensing limitations, ability thresholds, preferences, etc. as they relate to a weather event in a particular circumstance. The user or others may be able to modify these preferences or thresholds in various manners, such as written or oral request, logging into a system (e.g., the system of FIG. 2 or FIG. 3) which maintains the preferences and thresholds (e.g., in memory 22) and editing settings such as on a profile webpage (e.g., a weather briefing profile webpage); editing a text or data file; or editing an entry or entries in a database. FIG. 4 illustrates one possible example of a screen 40 (e.g., of a suitable webpage) which displays a table of custom thresholds or parameters 42A, 42B, 42C, etc. selected by a user of a system for generating PFHIs for aviators, as taught herein. The screen also contains an active link 44 to a page where these thresholds or parameters may be edited. Specifically, screen 40 shows that in this example, the user has been allowed to set thresholds for three types of ranges, each type being listed on one column. In column 46A are thresholds for unacceptable conditions. The background for the entries in column 46A may be shaded for a predetermined color and in this example that background is shaded for the color red; and when a condition occurs within the values of the first column, it may be displayed in the corresponding color. In this instance, a condition falling below the thresholds of column 46A is understood to be a dangerous or undesirable condition and displaying it in red conveys that context. Likewise, in column 46B, the background may be displayed in another color, such as yellow, to indicate conditions that fall between the problematic conditions of column 46A and the desirable/acceptable conditions of column 46C (and displayed in yellow on the icon), which may be given a green background and displayed in green on the icon. The final row 46D on the table of FIG. 4 shows an on or off status of a filter, so columns 46A-46C do not extend down to this row.

Figure 5:
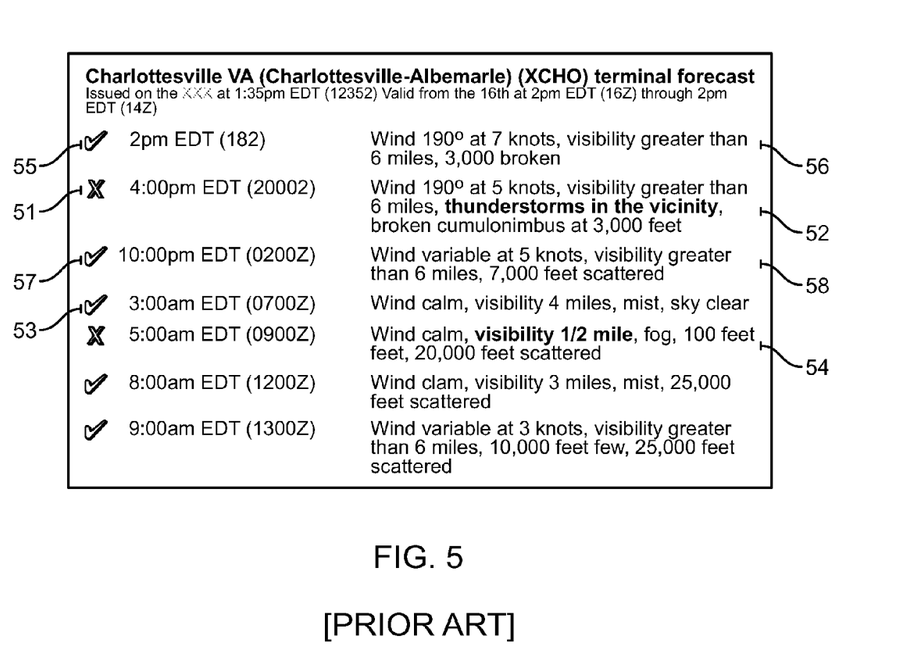
FIG. 5 is an illustration of a screen display of a prior art textual representation of weather forecast data for pilots, showing example weather conditions forecast for the Charlottesville-Albemarle airport in Virginia for several times over the course of a particular day.

Thresholds such as those illustrated in FIG. 4 are already in use to produce textual representations of forecast data. For example, using such thresholds, Peck Labs, Inc. (d/b/a Enflight or Enflight.com) has (including at a web site, www.enflight.com) commercialized a textual representation of weather forecast data, described in Peck, US 2003/0074454 A1, which provides a partial background for this patent application. An example is shown in FIG. 5. That example shows weather conditions forecast for the Charlottesville-Albemarle airport in Virginia for several times over the course of a particular day. The backgrounds for text blocks 52 and 54 are presented in red and corresponding red "X" marks appear in the left-most column at 51 and 53 because the forecast weather conditions define circumstances which, according to the requestor of this information, are not acceptable to him. By contrast, text of blocks 56 and 58 are presented with green background and corresponding green check marks appear in the left-most column at 55 and 57 because the forecast weather conditions at the indicated times define conditions defined as acceptable by the requester, as indicated in the database represented by FIG. 4.

Naturally, other colors and indicator symbols can be used but there should be some graphical presentation that indicates how the forecast conditions match the criteria or conditions specified by the requester. The processor 20 or 34 or 30 analyzes the forecast in light of the user's criteria and generates the display.

Figure 6:
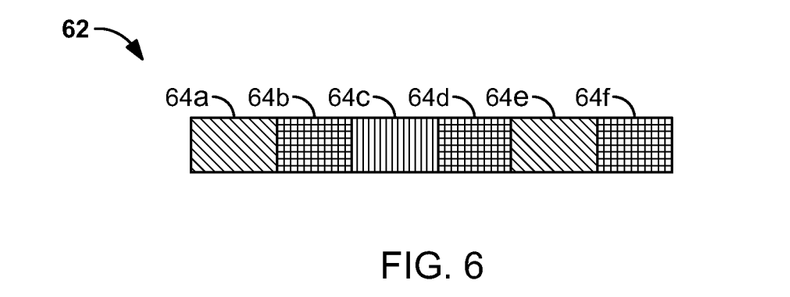
FIG. 6 is an example of a simple graphical PFHI as taught herein, shown as a rectangular timeline representing color-coded conditions over a succession of time intervals.

The coloration used in FIG. 5 addresses the fact that a textual presentation takes time for a user to understand, and can be complicated. An effort is made herein to make it faster and easier for a user to understand personal forecast data and the like. The graphical PFHI has therefore been developed. One possible example of a simple graphical PFHI is a rectangular timeline 62 of FIG. 6. In this particular example, intervals presented in green, such as 64A and 64E, represent safe conditions; yellow regions such as 64B, 64D and 64F, represent cautionary conditions; and red region 64C represents "no-fly" or unsafe or unacceptable conditions.

Other possible configurations of PFHIs include at least a circle, or a spiral, or an ellipse, or other rounded or cyclically repeating shapes such as coiled spring shapes as drawn in two dimensions, or a square, triangle, line or polygon, or any manner of representations of three-dimensional shapes such as but not limited to a sphere, helix, torus, ellipsoid, cube, tube, prism, etc., or any manner of "stretched" or distorted versions of the aforementioned shapes or representations.

In one particularly useful embodiment, a PFHI icon may depict a local condition history or forecast (LCHF), which provides the history or forecast of a condition at a particular location, if the condition is related to geography, or to some other parameter analogous to location that is appropriate to another domain of interest. One specific case of a LCHF is a TAF, or terminal area forecast, in which a weather forecast is given for an airport terminal and its immediate vicinity. In some such embodiments, a PFHI icon may be presented as a circular symbol, called a TAF Circle or an LCHF Circle.

Figure 7:
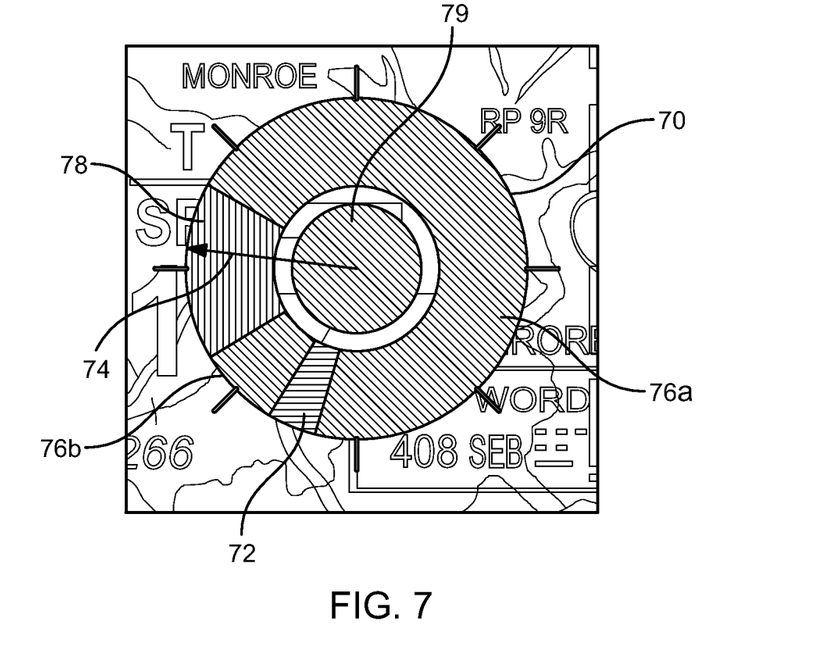
FIG. 7 is an example of a display of a circular PFHI as taught herein, superimposed on a map to illustrate presentation of weather conditions forecast for a particular location over a time interval defined by the circular icon.

FIG. 7 depicts one possible embodiment of a 24-hour TAF Circle, 70 superimposed on a map, such as the map of the area around an airport where a report of a weather forecast is being shown by the TAF Circle. A first segment, 72, lined for blue in this example (though other colors may be used), represents the issue time of the forecast and the period when no forecast is available. The white arrow 74 represents a current time, with the reference time (e.g., noon or midnight) being straight up or straight down, typically. An alternate form of a customized icon could place the current time at the top, so that the user can always read the time advancing clockwise from the top. In the embodiment shown in FIG. 7, weather forecast data, as applied to the particular aviator's personalized preferences and thresholds, is represented by various colors around the circle, in which time segments 76A and 76B, lined for the color green, represent safe flying conditions according to the pilot's personal preferences/thresholds; yellow segments (if any, none being shown in this example) represent flying conditions which would prompt caution; and regions such as 78, lined for display in red, represent unsafe, illegal, difficult, or otherwise undesirable flying conditions. (Naturally, the choice of color legend is arbitrary and forms no part of the invention—though the use of color may be important in some embodiments—but red, yellow and green are commonly used for analogous purposes, such as on traffic signals.)

In this particular example embodiment, the colored dot 79 in the center of the circle represents, according to personalized parameters, the current observations at the reporting station.

In some configurations, such an icon may be based on a 12-hour clock instead of a 24-hour clock, or on some longer or shorter interval. In some embodiments of a 24 hour version, midnight may be at the top and noon at the bottom. In other embodiments, any selected time of reference may be placed at the top. In yet other embodiments, the time scale of the LCHF Circle may be an arbitrary unit of time, such as days, months, seconds, years, etc.

Another possible embodiment is an LCHF Spiral, 80, which is a PFHI which can conveniently represent temporal phenomena which extend over several periods of 360 degrees, such as days, or with a change of scale, to an arbitrary timeframe. One implementation, for example, could allow for a full turn of the spiral to represent 12 or 24 hours. In some embodiments of an LCHF Spiral, it is useful to indicate midnight at the top and noon at the bottom. Two full turns of the spiral would represent 2 days. In this particular embodiment of a TAF Spiral (shown in FIG. 8), red, yellow, and green sections of the spiral have the same meaning as in the example of an embodiment of a TAF Circle shown previously in FIG. 7.

Figure 8:
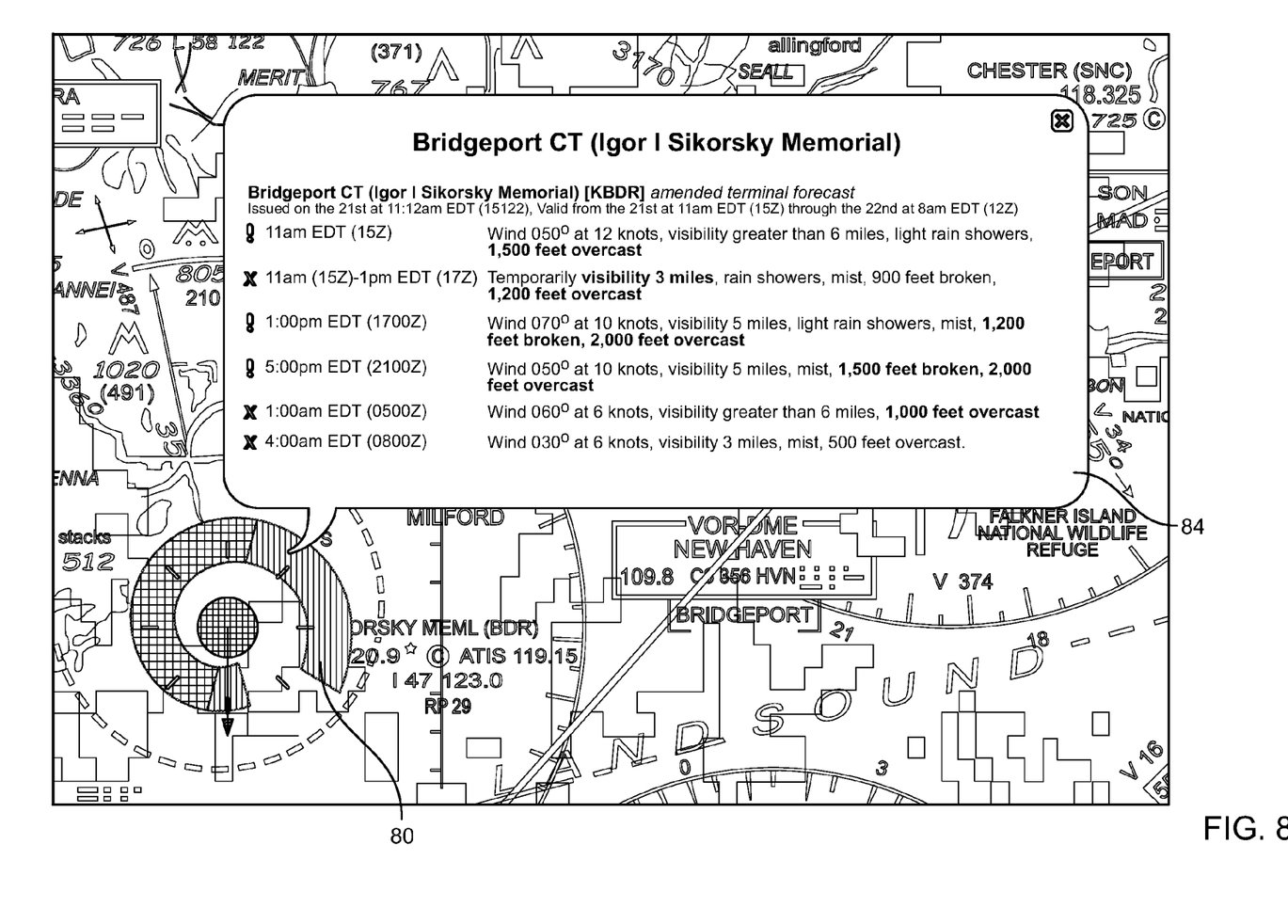
FIG. 8 is an example of a display of a spiral PFHI as taught herein, superimposed on a map to illustrate presentation of weather conditions forecast for a particular location over a time interval defined by the spiral, and showing a text block which can be made to appear by selecting a part of the icon.

In some embodiments, the colored dot in the center of the spiral may represent, according to personalized parameters, the current observations at the reporting station.

In some embodiments, the user may view the graphics containing the PFHI on a computer using appropriate display software or simply on a web browser. Optionally, segments of the icon may be coded to include active links, allowing a user to click on an element of the icon to activate a link to display (e.g., as an overlay or in another window) forecast details. For example, in some embodiments, clicking on the LCHF spiral may cause the forecast details to be displayed as text, as in the dialog box 84. The details or layout of said details may be customized according to the location of the click with respect to the overall chart, or with respect to the location of the LCHF Spiral.

Figure 9:
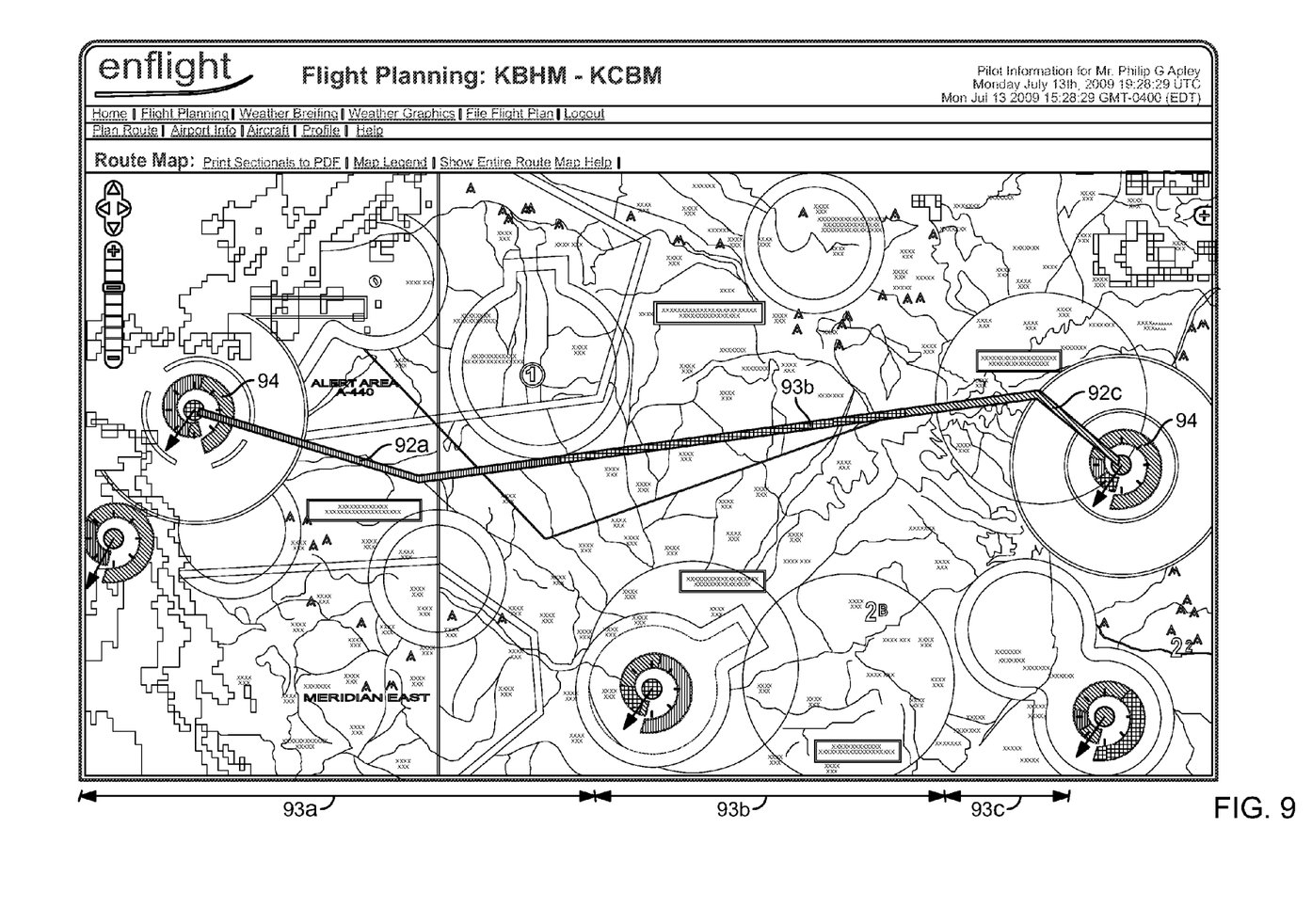
FIG. 9 is an example of a display showing the use of spiral PFHIs and a color-coded multi-segment flight path to illustrate weather forecasts for terminals of the flight and other points on the map, along with a color-coded forecast of conditions expected at intermediate points on the flight path if the flight departs at a specified time.

In some embodiments, wherein the domain of interest is weather forecasts for flight planning, with reference to FIG. 9 an entire selected flight route for an aviator may be displayed on a chart, for example, as a series of lines such as lines 92A, 92B, 92C connected end to end, and the personalized weather conditions may be displayed as colors or other attributes of the line at various locations along the journey, at the predicted time at which the aviator will arrive to said location according to the aviator's starting time and flight information. For example, portion 93A of the flight path might be shown in red, portion 93B in green and portion 93C in yellow. At various points along the route, including but not limited to the beginning and end of the route, a TAF Spiral 94 may be placed to give more complete forecast data for that point, though none appear in FIG. 9.

Figure 10:
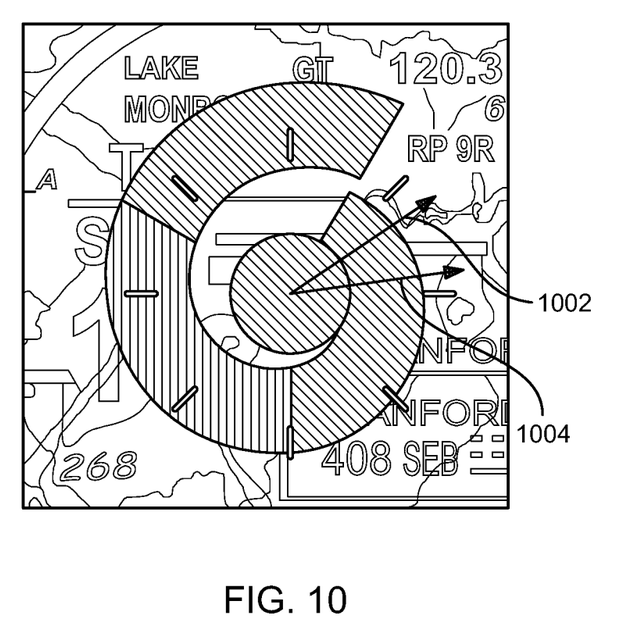
FIG. 10 is an example of a display of a spiral PFHI containing multiple arrows to represent, for example, two elements such as the current time and the predicted time at which the aviator will make his closest approach to the airfield upon which this TAF Spiral is centered.

In other example embodiments, the PFHI may contain more than one arrow representing more than one element. For example, in the chart of FIG. 10, the upper arrow 1002 (which might be displayed, for example, in light blue) depicts the current time, while the lower arrow 1004 (which might be displayed, for example, in white) depicts the predicted time at which the aviator will make his closest approach to the airfield upon which this TAF Spiral is centered.

In some embodiments, a client device such as a computer, cellular phone, mobile device, PDA, etc. is connected to a network, which may be an intranet, the Internet, a WAN, LAN, wireless network or some combination of the foregoing. The client device requests from an appropriate remote device connected to the network the weather data required to produce a TAF Spiral. In some embodiments, the device may be a panel mounted or hand-held GPS-based cockpit display and the connection could be via satellite or ground-based networking systems including ADS-B.

In other possible embodiments, the client device or a server device connected to a client device via a network may request or otherwise receive data from a live information feed or from measuring equipment. These data are then used to produce an LCHF Spiral or some other type of customized icon.

In yet other possible embodiments, a client device such as a computer, cellular phone, mobile device, PDA, etc. is connected to a web server over a network. The web server connects via a network to another server and receives weather forecast data for the location and processes it on behalf of the client, based on the client's specific personalized weather parameters stored in an appropriate database (such as the WXpert™ system of Peck Labs), formatting it according to the personal criteria. The web server sends personalized data to the client device over the network, with which the client device produces a graphical TAF Spiral or other form of icon as taught herein.

In some embodiments for producing a TAF Spiral, the client device sends a request containing a user identifier to the web server. The web server executes a file containing a script, which shall be called herein chart.py, providing as input to the script the user identifier received from the client device, which identifies the pilot within a database, which may be a MySQL database. For example: ../charts/chart.py-p 18688, in which 18688 represents a unique ID of the user in a database. In other embodiments, the client request might contain all of the client's conditional thresholds for use in customizing the weather forecast data.

The script executes and outputs weather forecast data in some machine readable format, such as HTML and/or JavaScript form, which is transmitted over the network to the browser executing on the client. The text may contain JavaScript that sets variables such as: var pilotid="18683".

The browser then executes machine-readable code, such as HTML and/or JavaScript, to begin to display the sections of the aviation map. The client device then sends a request to the server for TAF data, with the pilot id encoded as cgi-bin arguments, e.g., as follows:

http://server.tafcompany.com/cgi-bin/stage2.py?p=18688& . . .

The TAF data is then calculated by executing a script on the server, which causes a query of the database to receive the indicated pilot's wxpert settings (personalized weather parameters). In accordance with the disclosure in Peck (US 2003/0074454 A1), this list of TAF data is processed through a formatting or briefer program to produce html tables that are formatted according to the wxpert settings.

TAF tables are then produced by the execution of the script on the server, and sent over the network to the browser executing on the client. These tables are formatted to be readable by a pop-up text display component executing on the client device, which may be part of a client-side map display component, such as OpenLayers. These tables may be formatted to contain a pointer to each element of text to be displayed if a certain region on the display is clicked on with a pointing or selecting device, such as a mouse, pen, button press, etc., or otherwise selected, such as through touch on a touch-sensitive display. These tables may be formatted in a manner such as:

```
var taf_txt = [
"<table border='0' width='100%'>
    <tr><td colspan='2' class='h'>
        <b>Charlottesville VA (Charlottesville-Albemarle) [KCHO]</b>
        terminal forecast<div class='small'> issued on the 17th at 1:20pm
EDT (1720Z), valid from the 17th at 2pm EDT (18Z) through the 18th at 2pm EDT
(182)</div><td><tr>
    <tr><td nowrap='nowrap' width='5%'><img width='11' height='12'
align='top' border='0' src='http://delta.rho.net/img/wiz0.gif' /> 2pm EDT
(182)</td>
```

```
        <td class='g'>wind 240° at 3 knots, visibility greater than
6 miles, 1,500 feet few, broken cumulonimbus at 5,000 feet</td><tr>
        <tr><td nowrap='nowrap'><img width='11' height='12' align='top'
border='0' src='http://delta.rho.net/img/wiz3.gif' /> 3pm (192)-7pm EDT
(23Z)</td>
        <td class='b'>temporarily visibility 5 miles, <b>thunderstorms
with rain</b>, mist, overcast cumulonimbus at 3,500 feet</tdx/tr>
```

The time data may be sent to the client device in another table indicating the latitude and longitude of the center of the airport, the initial inner radius, the initial outer radius, begin hour, end hour, color, name of airport, and index to the above table of the text to display. Such a table may be formatted in a manner such as:

```
    taf_array = [
        [ -8545264.454889, 4866519.648323, 2800.0, 5600.0, 15, 24,
style_g, "Harrisburg PA ", taf_txt[22] ],
        [ -8545264.454889, 4866519.648323, 2800.0, 5600.0, 24, 35,
style_y, "Harrisburg PA ", taf_txt[22] ],
        [ -8545264.454889, 4866519.648323, 2800.0, 5600.0, 35, 38,
style_g, "Harrisburg PA ", taf_txt[22] ],
```

The client device receives the data tables from the server and then executes code to create the TAF Spirals from the data. This code may be Javascript, and in one possible implementation, may be designed as follows. Each data element in taf_array is used to produce a TAF Spiral. The spiral may be produced by drawing a multitude of arcs based on the begin and end hours of each segment of the TAF data. Successive arc shapes are drawn to represent the hours of the day from the begin hour to the end hour by one hour increments, creating successive wedge-shaped polygons, with each point in the polygon having its radius distance scaled by the hour of the TAF report time, and the color of each one-hour section colored by the personalized weather data for that hour. The OpenLayers' addFeatures method may be used to display the spiral in the chart window, and a possible implementation of the spiral producing do_a_taf routine is reproduced in Appendix A, below.

This invention is not limited in its application to the details of construction and the arrangement of components set forth in the foregoing description or illustrated in the drawings. The invention is capable of other embodiments and of being practiced or of being carried out in various ways. For example, rather than employing a client-server relationship in which forecast or history data must be requested from a server, a stand-alone device may receive broadcast information of, for example, weather reports, store some or all of the broadcast information for use when desired, and then on request process the stored information to extract the relevant data and, using the supplied personalization information, which also may be stored locally in the device. generate a display of a personalized forecast or history using the icon presentations discussed above. The broadcast received/monitored by the device may be terrestrial radio broadcasts, satellite broadcasts, internet broadcasts or other data feeds. Appropriate modules may provide local data storage for the broadcast information (or portions thereof filtered according to any desired criteria), local data storage for personal preference information or other personalization information, one or more processors, memory for storing programming instructions, and one or more output devices. Another alternative would be a stand-alone device that collects local data from sensors, be they weather or other sensors, rather than receiving broadcast information.

The phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

APPENDIX A

A possible implementation of the do_a_taf routine is reproduced below:

```
function do_a_taf(td, idx) {
    var bar = td;
    if (bar!==null)
    {
                // drawAnArc( x, y, ir, or, ba, ea, style)
                polygonFeature = drawAnArc(td[0], td[1], td[2], td[3], td[4],
td[5], td[6]);
                polygonFeature.attributes.name = td[7];
                polygonFeature.attributes.description = td[8];
                metarLayer.addFeatures(polygonFeature);
                // tic marks
                tic_marks(td[0], td[1], td[3]);
                var lineFeature = draw_now(td[0], td[1], td[3]);
                lineFeature.attributes.name = td[7];
                lineFeature.attributes.description = td[8];
                metarLayer.addFeatures(lineFeature);
    }
}
```

-continued

```
// draw the tic marks outside of the taf circle
function tic_marks(x, y, or) {
    var scale = 1.0;
    var style_tick = {
            strokeColor: "#000000",
            strokeWidth: 1,
            pointRadius: 6,
            pointerEvents: "visiblePainted"
    };
    var cpoint = new OpenLayers.Geometry.Point(x, y);
    for (var p = 0; p <= 24; p = p + 3) {
            var pointList = [ ];
            var a = p * (2 * Math.PI) / 24;
            var rad = or;
            var newPoint = new OpenLayers.Geometry.Point(cpoint.x + (rad *
Math.sin(a)), cpoint.y + (rad * Math.cos(a)));
            pointList.push(newPoint);
            rad = or - 1000;
            newPoint = new OpenLayers.Geometry.Point(cpoint.x + (rad *
Math.sin(a)), cpoint.y + (rad * Math.cos(a)));
            pointList.push(newPoint);
            // create a line feature from a list of points
            var lineFeature = new OpenLayers.Feature.Vector(
            new OpenLayers.Geometry.LineString(pointList), null,
style_tick);
            metarLayer.addFeatures(lineFeature);
    }
}
function draw_now(x, y, or) {
    var style_hand = {
            strokeColor: "#FFFFFF",
            strokeWidth: 2,
            pointRadius: 6,
            pointerEvents: "visiblePainted"
    };
    var now = new Date( );
    var hr = now.getHours( );
    var mn = now.getMinutes( );
    //hr = 2;
    //mn = 0;
    var a = ((hr * 60) + mn) * (2 * Math.PI) / (24 * 60);
    var cpoint = new OpenLayers.Geometry.Point(x, y);
    // the arrow at the end of the hour hand
    var b = 0.1;
    var c = 500;
    var scale = 1.0;
    var rad;
    //var rad = or;
    //rad = (or * scale) + (a * 200) - 1000; // radius units???
    rad = (or * scale) + (a * 200);
    var pointList = [ ];
    var newPoint = new OpenLayers.Geometry.Point(cpoint.x + ((rad - c)
* Math.sin(a - b)), cpoint.y + ((rad - c) * Math.cos(a - b)));
    pointList.push(newPoint);
    newPoint = new OpenLayers.Geometry.Point(cpoint.x + (rad *
Math.sin(a)), cpoint.y + (rad * Math.cos(a)));
    pointList.push(newPoint);
    newPoint = new OpenLayers.Geometry.Point(cpoint.x + ((rad - c) *
Math.sin(a + b)), cpoint.y + ((rad - c) * Math.cos(a + b)));
    pointList.push(newPoint);
    var lineFeature = new OpenLayers.Feature.Vector(
    new OpenLayers.Geometry.LineString(pointList), null, style_hand);
    // should return this so that arrowhead has pop-up handler added
    metarLayer.addFeatures(lineFeature);
    // the hour hand
    pointList = [ ];
    //rad = or;
    //rad = or * scale + a * 200 - 1000; // radius units???
    newPoint = new OpenLayers.Geometry.Point(cpoint.x, cpoint.y);
    pointList.push(newPoint);
    newPoint = new OpenLayers.Geometry.Point(cpoint.x + (rad *
Math.sin(a)), cpoint.y + (rad * Math.cos(a)));
    pointList.push(newPoint);
    // create a line feature from a list of points
    lineFeature = new OpenLayers.Feature.Vector(
    new OpenLayers.Geometry.LineString(pointList), null, style_hand);
    //metarLayer.addFeatures( lineFeature );
```

```
            // return this so that now line has pop-up handler added
            return lineFeature;
}
//==================================================
// .g          { background: #cfc none; color: #000 } /* wx good:
GREEN or suppress */
// .m          { background: #ffc none; color: #000 } /* wx marginal:
YELLOW */
// .b          { background: #fcc none; color: #000 } /* wx below:   RED
*/
// .w          { background: #fff none; color: #000 } /*              #fff
*/
// .h          { background: #eee none; color: #000 } /* gray bg for taf
headers */
function do_tfr_layer_defs( ) {
    style_tfr = OpenLayers.Util.extend({ },
    OpenLayers.Feature.Vector.style['default']);
    //style_tfr.strokeColor = "red";
    //style_tfr.strokeColor = "#CC99FF"; // purple
    //style_tfr.fillColor = "#CC99FF";
    //style_tfr.fillOpacity = 0.6;
    style_tfr.strokeColor = "#666666"; // gray
    style_tfr.fillColor = "#666666";
    //style_tfr.fillOpacity = 0.6;
    style_tfr.strokeColor = "#990033"; // burgandy
    style_tfr.fillColor = "#990033";
    style_tfr.fillOpacity = 0.3;
}
//==================================================
// BOS 42.3629722 / −71.0064167
// polygonFeature = drawAcircle( −71.0064167, 42.3629722, 50, style_g);
// polygonFeature.attributes.name = "Boston MA (General Edward Lawrence
Logan Intl)";
// polygonFeature.attributes.description = "hourly observation on the
19th at 10:54am EDT (1454Z)<br>wind 170° at 8 knots<br> visibility
10 miles<br> sky clear below 12,000 feet<br> temperature 21°C
(70°F)<br> dewpoint 12°C (54°F)<br> altimeter 29.86<br>
automated station with precipitation discriminator<br> sea level
pressure 29.85″ Hg (1011.0 hPa)<br> temperature 21.1°C
(70.0°F)<br> dewpoint 12.2°C (54.0°F)<br> 3-hour barometric
pressure increasing then decreasing by 0.009″ Hg (0.3 hPa).";
// metarLayer.addFeatures( polygonFeature );
function do_metars_and_tafs_defs( ) {
    style_g = OpenLayers.Util.extend({ },
    OpenLayers.Feature.Vector.style['default']);
    style_g.strokeColor = "green";
    style_g.fillColor = "green";
    style_g.fillOpacity = 0.7;
    style_m = OpenLayers.Util.extend({ },
    OpenLayers.Feature.Vector.style['default']);
    style_m.strokeColor = "yellow";
    style_m.fillColor = "yellow";
    //style_m.fillOpacity = 0.7; // default was 0.4
    style_m.fillOpacity = 0.8;
    style_b = OpenLayers.Util.extend({ },
    OpenLayers.Feature.Vector.style['default']);
    style_b.strokeColor = "red";
    style_b.fillColor = "red";
    style_b.fillOpacity = 0.7;
    style_n = OpenLayers.Util.extend({ },
    OpenLayers.Feature.Vector.style['default']);
    style_n.strokeColor = "blue";
    style_n.fillColor = "blue";
    style_n.fillOpacity = 0.7;
    style_r = OpenLayers.Util.extend({ },
    OpenLayers.Feature.Vector.style['default']);
    style_r.strokeColor = "blue";
    style_r.fillColor = "blue";
    style_r.fillOpacity = 0.6;
}
//==================================================
function drawAcircle(x, y, r, style) {
    var cpoint = new OpenLayers.Geometry.Point(x, y); // ???
    // create a polygon feature from a linear ring of points
    var pointList = [ ];
    for (var p = 0; p < 35; ++p) {
        var a = p * (2 * Math.PI) / 36;
        var rad = r; // radius in degrees? take stupid scale out!!!
        var newPoint = new OpenLayers.Geometry.Point(cpoint.x + (rad *
```

```
Math.cos(a)), cpoint.y + (rad * Math.sin(a)));
            pointList.push(newPoint);
        }
        pointList.push(pointList[0]); // and close off circle back to 1'st
point
        var linearRing = new OpenLayers.Geometry.LinearRing(pointList);
        var polygonFeature = new OpenLayers.Feature.Vector(
        new OpenLayers.Geometry.Polygon([linearRing]), null, style);
        return polygonFeature;
}
// =================================================
// x,y of center, inner, outer radius, begin, end arc, color style
function drawAnArc(x, y, ir, or, ba, ea, style) {
        var cpoint = new OpenLayers.Geometry.Point(x, y); // ceter point
        var scale = 1.0; // radius in degrees? take stupid scale out!!!
        var p;
        var a;
        var rad;
        var newPoint;
        var gap = 150;      // gap between spiral arms (?)
        var adjust = 2000;  //
        // create a polygon feature from a linear ring of points
        var pointList = [ ];
        for (p = ba; p <= ea; ++p) {
            a = p * (2 * Math.PI) / 24;
            // notspiral: rad = ir; // + a * 300.0;
            // spiral:
            rad = (ir * scale) + (p * gap) - adjust;
            newPoint = new OpenLayers.Geometry.Point(cpoint.x + (rad *
Math.sin(a)), cpoint.y + (rad * Math.cos(a)));
            pointList.push(newPoint);
        }
        for (p = ea; p >= ba; --p) {
            a = p * (2 * Math.PI) / 24;
            // not_spiral: rad = or; // + a * 300.0; // radius units???
            // spiral:
            rad = (or * scale) + (p * gap) - adjust;
            newPoint = new OpenLayers.Geometry.Point(cpoint.x + (rad *
Math.sin(a)), cpoint.y + (rad * Math.cos(a)));
            pointList.push(newPoint);
        }
        pointList.push(pointList[0]); // and close off circle back to 1'st
point
        var linearRing = new OpenLayers.Geometry.LinearRing(pointList);
        var polygonFeature = new OpenLayers.Feature.Vector(
        new OpenLayers.Geometry.Polygon([linearRing]), null, style);
        return polygonFeature;
}
//=================================================
function drawApolygon(points, style) {
        // create a polygon feature from a linear ring of points
        var pointList = [ ];
        for (var p = 0; p < points.length; p = p + 2) {
            var newPoint = new OpenLayers.Geometry.Point(points[p],
points [p + 1]);
            pointList.push(newPoint);
        }
        pointList.push(pointList[0]);
        var linearRing = new OpenLayers.Geometry.LinearRing(pointList);
        var polygonFeature = new OpenLayers.Feature.Vector(
        new OpenLayers.Geometry.Polygon([linearRing]), null, style);
        return polygonFeature;
}
```

What is claimed is:

1. A method for processing and reporting weather forecast data for aviation route planning comprising:

associating personalized desirability values with a unique identifier for a user;

sending a request to a server for personalized weather forecast data for a particular geographic region, said request containing at least a unique identifier for a user;

generating the personalized weather forecast data for a user and particular geographic region as a function of weather forecast data and the personalized desirability values;

receiving the personalized weather forecast data from the server for said region, wherein said data contain one or more personalized desirability values of forecasted weather conditions for said region at a plurality of times, generated using weather forecast information for said region and conditionals specific to the user; and generating a graphical element on a display device based on the received personalized weather forecast data, wherein the location of the graphical element on the display device corresponds to said geographic region, and wherein a color of the graphical element at each of a plurality of points upon the element is determined based on the personalized desirability value of the forecasted weather conditions at a specific time, said time corresponding to a rotational angle of said point upon the element, relative to a predetermined reference position where 360 degrees of the rotational angle corresponds to some unit of time.

2. The method of claim 1 wherein the graphical element is circularly shaped.

3. The method of claim 1 wherein the graphical element is spiral-shaped.

4. A system comprising:
a display device;
one or more processors and one or more memories containing instructions which, when executed by the processor or processors cause the processor or processors to send a request over a network to a server for personalized weather forecast data for a particular geographic region, said request containing at least a unique identifier for a user, wherein desirability values and conditionals are associated with a specific user;
receive personalized weather forecast data from the server for said region, wherein said data contain a multiplicity of personalized desirability values of forecasted weather conditions for said region at a multiplicity of time values, generated using weather forecast information for said region and the desirability values and conditionals specific to the user, and
generating a graphical chart on a display device based on the received personalized weather forecast data, wherein the location of the graphical chart on the display device corresponds to said geographic region, and furthermore wherein the colors of the chart at each of a multiplicity of points upon the chart are each determined based on the personalized desirability value of the forecasted weather conditions at a time value, said time value corresponding to a rotational angle of said point upon the chart where 360 degrees of the rotational angle corresponds to some unit of time.

5. The system of claim 4, wherein the chart is in the shape of a spiral.

6. The system of claim 4, wherein the chart is circular in shape.

7. A system comprising a display device, one or more processors and one or more memories containing processor executable instructions which, when executed by the one or more processors cause the one or more processors to:
associate personalized thresholds and conditionals with a user;
send a request over a network to a server for weather forecast data for a particular geographic region;
receive weather forecast data from the server for said region;
using the received weather forecast data and the personalized thresholds and conditionals stored in the one or more memories, calculate a plurality of personalized desirability values of forecasted weather conditions for said region at a plurality of time values; and
generate a graphical icon on the display device based on the calculated personalized desirability values, wherein the colors of the icon at each of a plurality of points upon the icon are each determined based on the personalized desirability value of the forecasted weather conditions at a time value, said time value corresponding to a rotational angle of said point upon the icon and where 360 degrees of the rotational angle corresponds to some unit of time.

8. The system of claim 7, wherein the graphical icon is in the shape of a spiral.

9. The system of claim 7, wherein the graphical icon is circular in shape.

10. A method for displaying weather forecast data for aviation route planning comprising:
associating personalized aviator thresholds or conditionals with a user;
displaying on a display medium a graphical icon produced from personalized desirability values generated from weather forecast data and the personalized aviator thresholds or conditionals;
wherein:
the location of the graphical icon on the display medium corresponds to a location on said aviation route and, the colors of the graphical icon at each of a plurality of points upon the graphical icon are each determined based on the personalized desirability value of the forecasted weather conditions at a time value and, the time value corresponds to a rotational angle of said point upon the graphical icon and, 360 degrees of the rotational angle corresponds to some unit of time.

11. The system of claim 10, wherein the graphical icon is in the shape of a spiral.

12. The system of claim 10, wherein the graphical icon is circular in shape.

13. The method of claim 1 where the graphical element is configured to be responsive to user interaction by opening a popup display.

14. The method of claim 1, wherein the graphical element is shaped as an annulus.

15. The system of claim 4, wherein the chart is annular in shape.

16. The system of claim 7, wherein the graphical icon is annular in shape.

17. The system of claim 10, wherein the graphical icon is annular in shape.

18. The system of claim 4 where the graphical chart is configured to be responsive to user interaction by opening a popup display.

19. The system of claim 7 where the graphical icon is configured to be responsive to user interaction by opening a popup display.

20. The method of claim 10 where the graphical icon is configured to be responsive to user interaction by opening a popup display.

* * * * *